R. GILLMON.
Beater for Cotton-Openers.
No. 223,039. Patented Dec. 30, 1879.
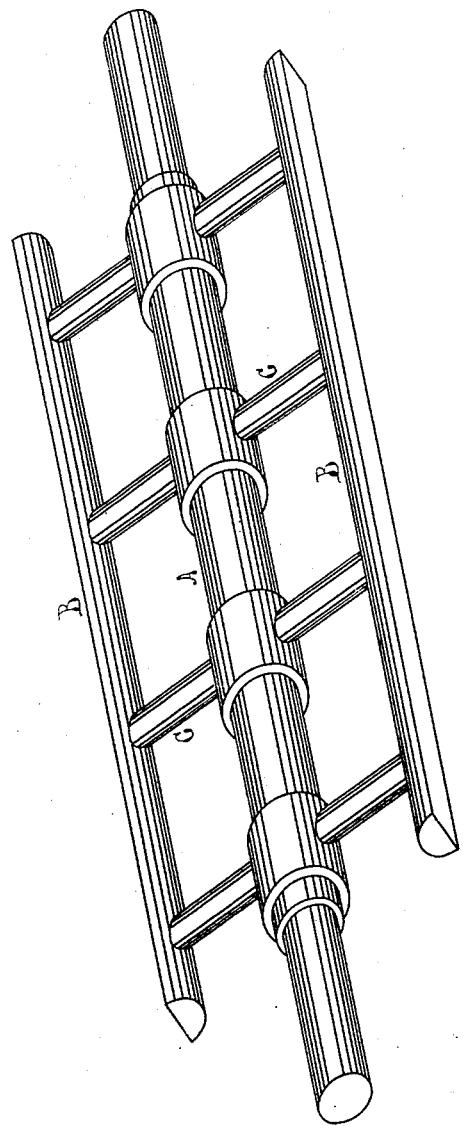
Witnesses
Wm. S. Brown
H. F. Welch
Inventor
Richard Gillmon
by A. K. Garland
Atty

UNITED STATES PATENT OFFICE.

RICHARD GILLMON, OF KILLINGLY, CONNECTICUT.

IMPROVEMENT IN BEATERS FOR COTTON-OPENERS.

Specification forming part of Letters Patent No. 223,039, dated December 30, 1879; application filed July 16, 1878.

*To all whom it may concern:*

Be it known that I, RICHARD GILLMON, of Killingly, in the county of Windham and State of Connecticut, have invented certain new and useful Improvements in Beaters for Cotton-Openers, of which the following is a description.

The object of my invention is to construct a beater for cotton-openers adapted to prevent the gathering of cotton on the blades or arms thereof and the consequent clogging of the beater.

The rapid revolution of the beater in the closed box causes the rotation of the air therein, carrying with it fibers and bunches of cotton which gradually collect on the rear of the blades and arms of the beater, and the latter is soon clogged, so that the machine has to be frequently stopped and the beater cleared.

Heretofore, in all operative machines, the beater-blades have been made substantially of a rectangular shape in section. This form has been used because it was necessary to construct the blade with a width of edge sufficient to strike the cotton to break the lumps and disentangle it without cutting the fiber, as would a blade made thin at its edge, or knife-edged, and to avoid crowding the cotton outward against the under feed-roll, as would a round blade, thereby endangering the blade whenever any especially compact bunch happened to pass the feed-rolls; but both the round and the rectangular form of blade are objectionable, because the 'tendency of the cotton to fly after the blade and pile itself up behind and on the blade, beginning at the point of intersection of the arm and blade, and gradually accumulating the entire length of the blade, soon renders it necessary to stop the machine to clear it.

I have discovered that the current of air in the box generated by the revolution of the beater and modified by the exhaust-fan may be so varied by the shape of the beater-blades that the cotton in the box will be prevented from gathering on or about the blades or arms, and thus the beater will work with perfect freedom and without clogging.

My invention consists in the combination of the shaft and arms with the beater-blades, which are semi-cylindrical in section, with the curved portion on the inside of the beater.

By this form of blade the currents of air before and behind it, when in operation, are changed so that they have no eddies in them, and there will be no vacuum behind the blade.

Forward of the blade the single edge cuts the air, instead of crowding it upon itself, as a rectangular or other than single angle form does, and behind the blade the air closes without an eddy, so that if by the draft of air caused by the rotation of the beater or the exhaust-fan any cotton should be drawn after the blade it will not load thereon, but will be thrown outward clear of the blade, or left, if at all, upon an edge, which, being upon the circumference of the circle formed by the rotation of the blade, will at the next revolution be brought so near to the feed-rollers that it will be swept off, thus clearing the blade and perfecting the work.

While thus avoiding any angle behind which the cotton might accumulate, I produce a blade without the thin knife-edge which would cut the fiber, and also a blade which, having similar angles, can be reversed when one of them becomes rounded and worn by use.

The figure of drawing shows my improved beater.

A represents the shaft; B B, the blades, and C C the arms. These several parts are attached to each other in the usual manner.

The blades of the beater I make with a flat exterior surface and curved interior or opposite surface, the curvature being continued until it meets the flat exterior surface. This curvature of the interior surface of the blades, so made, changes the direction of the currents of air in the beater-box, so that the cotton is swept away from the corners around the arms and blades by the air, and thus all liability of the cotton gathering on the blades and impeding the action of the beater is prevented.

What I claim is—

The combination of the shaft A and arms C C with the blades B B, whose outer faces are chords of the circles which form the inner surfaces of the blades, substantially as described.

RICHARD GILLMON.

Witnesses:
H. C. PERHAM,
A. K. GARLAND.